(12) United States Patent
Bernard

(10) Patent No.: X9012
(45) Date of Patent: Aug. 17, 1835

(54) COMPSITION, FOR MEDICAL PURPOSES

(76) Inventor: Robert S. Bernard

Robert T. Bernard.

The schedule referred to in these letters Patent and making part
of the same containing a description in the words of the said Robt.
T. Bernard himself of his improvement in a compound or compo
sition of matter for Medical purposes called a remedy for the
Cholera, To all to whom these presents shall come
Be it known that I Robert T. Bernard of Norfolk in the
county of Norfolk and State of Virginia have invented a new
and useful improvement in a composition of matter, for
Medical purposes " called remedy for Asiatic Cholera, Cholera
Morbus, Diarrhœa &c. and that the following is a full and
exact description of the process, or proportions of compounding
the same viz. according to the proportions given of the following
ingredients, Sulphate of Alum. 2 grains, Sup. Carb. potass 1 ditto
Alcahol at 80 degrees above proof 40 drops, Gum camphor
20 grains, Hoffmans Anodyne Elixir ½ oz. White sugar ½
oz. compound Tinct. Opium ½ oz Spirits Lavender 1 oz. pure
water 3 oz. which are to be mixed together, and taken according
to the following directions viz. Take a tablespoon full of the Mix
ture with the same quantity of water, every hour or half hour
as occasion may require, until vomiting, purging, and pains
have ceased. This Medicine has been administered to Children
affected with Diarrhœa or Cholera Morbus in doses of a tea
spoon full with the same quantity of water, with complete success
The bottle should be kept well corked. In testimony that the
above is a full and exact description of the composition of
matter, or the ingredients of which my Mixture is formed,
I have hereunto set my hand this thirtieth day of July
Eighteen hundred and thirty five Robert T. Bernard Witness
C H W Wharton
Henry Stone (330 words)

Exd.
W.G.C.